ated Mar. 19, 1985

United States Patent [19]
Cozac et al.

[11] Patent Number: 4,505,781
[45] Date of Patent: Mar. 19, 1985

[54] METHOD OF REDUCING LIGHT REFLECTION FROM GLASS SURFACES

[75] Inventors: Daniel Cozac, Braine l'Alleud; Hugo Rogghe, Mol, both of Belgium

[73] Assignee: Glaverbel, Brussels, Belgium

[21] Appl. No.: 408,741

[22] Filed: Aug. 17, 1982

[30] Foreign Application Priority Data

Aug. 20, 1981 [GB] United Kingdom ............... 8125538

[51] Int. Cl.³ .................... C03C 15/00; B41C 1/00
[52] U.S. Cl. .................... 156/640; 156/345; 156/663
[58] Field of Search ............ 427/421, 424, 168; 156/640, 345, 663

[56] References Cited

U.S. PATENT DOCUMENTS

| | | | |
|---|---|---|---|
| 2,822,635 | 2/1958 | Mears | 156/640 |
| 3,184,328 | 5/1965 | Wagner et al. | 427/424 |
| 3,885,066 | 5/1975 | Schwenninger | 427/424 X |

FOREIGN PATENT DOCUMENTS 1151931 5/1969 United Kingdom .

Primary Examiner—Shrive P. Beck
Attorney, Agent, or Firm—Spencer & Frank

[57] ABSTRACT

In a method of modifying the light reflecting properties of a glass surface by spraying the surface with an etching solution via a bank of spray nozzles while the nozzles and glass surface are relatively moved past one another, conformity of treatment is improved by effecting such relative passage while the nozzles deliver synchronously oscillating divergent spray cones whose relative spatial relationship and/or amplitude of oscillation is such that in any one cycle the impact zones of the spray cones on the glass surface together cover a continuous band-like impact region extending in a direction across such surface transversely of the direction of relative passage.

16 Claims, 4 Drawing Figures

METHOD OF REDUCING LIGHT REFLECTION FROM GLASS SURFACES

BACKGROUND OF THE INVENTION

This invention relates to a method of modifying the light reflecting properties of a glass surface comprising spraying such surface with an etching solution via a bank of spray nozzles. The invention extends to apparatus for performing such a method.

It is well known that when visible light is incident upon a transparent glass sheet, some of the light, in fact about 4%, is reflected at each of the glass/air interfaces, and there are instances where this specular reflection is very inconvenient. A well known example is the glass in picture frames. In cases where the illuminating light incident upon the glass emanates from a relatively bright source such as from a lamp or as direct sunlight, the specularly reflected light may be more intense than that reflected from the picture itself with the result that an image of the light source obscures the picture.

Specular reflection is also responsible for phenomena such as Newton's rings and other interference effects which are inconvenient in certain circumstances such as when viewing photographic diapositives sandwiched between sheets of glass or when viewing objects through double glazing units whose panes are not parallel.

Various proposals have been made for treating a glass surface with an etching solution in order to reduce or eliminate these interference phenomena, for example as described in Glaverbel's British Patent specification No. 1,151,931. There remains however a problem of reliably achieving a uniform modification of the glass surface, as is desirable for high quality products.

SUMMARY OF THE INVENTION

It is an object of this invention to provide a method of modifying the light reflecting properties of a glass surface which facilitates uniform treatment of such surface.

According to the present invention, there is provided a method of modifying the light reflecting properties of a glass surface comprising spraying such surface with an etching solution via a bank of spray nozzles while such bank of nozzles and glass surface are relatively moved past one another, characterised in that such relative passage of the glass surface and the nozzles is effected while the nozzles deliver synchronously oscillating divergent spray streams (hereafter called "spray cones") whose relative spacial relationship and/or amplitude of oscillation is such that in any one cycle the impact zones of the spray cones on the glass surface together cover a continuous band-like impact region extending in a direction across such surface transversely of the direction of such relative passage.

The divergent streams of droplets emanating from the spray nozzles will under normal operating conditions be generally conical, and for the sake of convenience such divergent streams will be referred to hereinafter as spray cones. It will of course be appreciated that the form of such droplet streams may not always be strictly conical in practice, particularly if the etching solution is sprayed in a fine mist, for example by nozzles functioning on the ejector principle as is the case in some preferred embodiments of the invention.

Hitherto the etching solution has been applied by fixed spray nozzles in spray cones whose axes each describe a straight line along the surface being treated in the direction of movement of the glass. Unless the spraying is very precisely controlled, which can be difficult in practice mainly because the etching solutions used are generally sprayed at a relatively low pressure, this will lead to a non-uniform treatment of the glass which manifests itself in irregular optical characteristics of the treated glass. In particular, whitish strips may become apparent over the treated glass surface thus rendering the product less valuable. Such defects may be masked by subjecting the treated glass to a second, and even a third and fourth, etching treatment, but this has the disadvantages of requiring a greater consumption of etching solution, and it gives a product whose surface is very heavily etched and may be more matt than is desirable. By causing the spray cone impact zones to follow oscillating paths across the glass surface, precise control of the spraying becomes less critical and better results can be achieved more easily. In particular, good anti-reflection properties can be achieved with a less matt surface on the glass than has hitherto been the case thus implying that the reflection modifying treatment can be performed more rapidly and/or using less etching composition.

It will of course be appreciated that for the best results the spray nozzles should be equally spaced and deliver equal volume rates of the etching solution, and that the speed of relative passage should be constant.

Preferably, the impact zones of neighbouring spray cones are contiguous or overlap during at least part of their oscillation. This promotes uniformity of application within the band-like impact region during such part (or whole) of the oscillations.

Advantageously, the amplitude of oscillation of the centre of each spray cone impact zone is at least equal to the spacing, in a direction normal to the direction of relative passage, between that impact zone centre and the centre of its (or each of its) neighbouring impact zone(s) when they are at their median positions. This also promotes uniformity of application of the etching solution since it ensures that each increment of glass surface in the length of the band-like impact zone will be swept by central and outer parts of at least two spray cones so that any differences which may exist in the density of the etching solution droplet population in those parts of any spray cone will have little or no effect on the uniformity of application of that solution.

Preferably, the width of each said spray cone impact zone in said direction of relative passage, the speed of said relative passage and the frequency of said oscillation are such that said width is at least twice the wavelength of the oscillations of the centres of the spray cone impact zones on the glass, and optimally said width is at least four times said wavelength. These features again promote uniformity of coverage of the glass surface by ensuring that each increment of glass surface across the width of the band-like impact region will be swept several times.

The spray cones can be caused to oscillate in various ways, for example by subjecting the bank of spray nozzles to a bodily to and fro movement while the spray cones traverse the glass surface, but it is much more convenient in practice for each said nozzle to be pivotally oscillated about a local axis.

This is convenient from the point of view of simplifying the construction of apparatus for performing the method, and in embodiments of the invention in which the glass is sprayed while its surface is generally vertical (thus implying that the nozzles are arranged in an upwardly extending bank) it has the additional advantage of making it easier to maintain a constant pressure head at each nozzle. The expression "local axis" is used to denote that the point about which each nozzle pivots is closer to that nozzle than to any other. A said axis may for example pass through its associated nozzle or it may lie immediately above or below or in front of or behind such nozzle.

The glass surface may be sprayed while it is generally horizontal, or indeed in any other orientation, but it has been found that spraying the glass surface while it is generally vertical, as is preferred, is particularly convenient and gives good results in terms of the optical properties of the product obtained without requiring too much floor space for the necessary apparatus.

Preferably the glass is moved past the nozzles rather than vice versa, since this lends itself much more readily to series production.

In especially preferred embodiments of the invention, at any given instant the centres of the spray cone impact zones lie on a substantially straight line and the spray cones are oscillated along that line. Alternatively or in addition, it is particularly advantageous that, at any given instant the centres of the spray cone impact zones lie on a substantially straight line extending substantially at right angles to said direction of relative passage. The first of these two features promotes uniformity of application of etching solution within the band-like impact region, and the second feature, especially when taken in conjunction with the first implies that any given increment of length of the glass surface (the length being taken in the direction of relative passage) will be treated at the same time. This in turn implies that etching solution will remain in contact with the glass surface for equal periods of time across its width, provided of course that subsequent rinsing or neutralisation of the etching solution is carried out in an appropriate manner.

Preferably, each said spray nozzle is fed from its own reservoir with fluid to be sprayed, especially when use is made of a bank of spray nozzles for spraying a vertical glass surface, since this facilitates feeding all the nozzles at the same pressure head.

The glass surface to be etched should of course be clean prior to spraying of the etching solution, and, as referred to in Glaverbel's British Patent specification No. 1,151,931, the way in which this is done can have a significant effect on the optical properties of the glass surface after etching. In order to promote high optical quality, prior to the spraying of said etching solution, said glass surface is washed by spraying fluid from a bank of nozzles and such washing step is preferably characterised by any feature or features defined above in respect of the spraying of said etching solution.

It is preferred that excess cleaning fluid be removed from said glass surface immediately prior to its being sprayed with said etching solution.

After the etching fluid has been allowed to react with the glass for a desired dwell time, it must of course be neutralised or flushed off, and the way in which this is done can also have effect on the optical properties of the glass surface. In order to promote high optical quality, it is preferred that after a desired dwell time, such reactive substance is flushed off the glass by spraying from a plurality of nozzles.

BRIEF DESCRIPTION OF THE DRAWINGS

A preferred embodiment of the invention will now be described with reference to the accompanying diagrammatic drawings in which.

DESCRIPTION OF THE PREFERRED EMBODIMENTS

Figure 1:
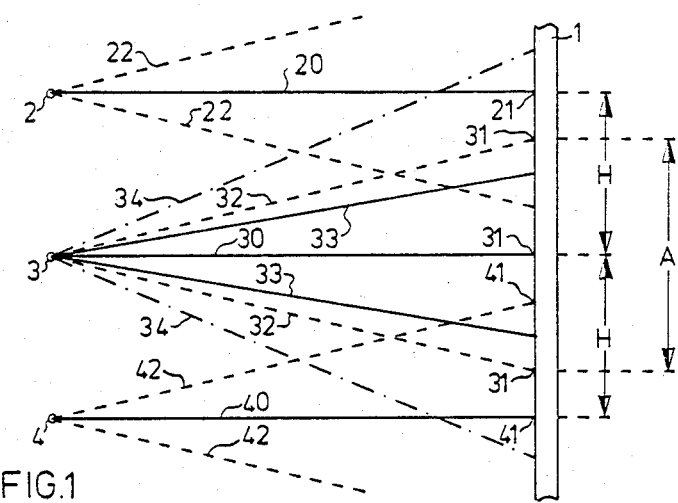
FIG. 1 is a schematic view in a direction along a surface of a glass sheet showing the way in which cones of etching solution sprayed onto the glass are oscillated according to the invention.

In FIG. 1, a glass sheet 1 is sprayed by a bank of three nozzles (not shown) which oscillate about three pivot axes 2, 3, 4. In FIG. 1, the axes of these spray cones are shown in their median positions at 20, 30, 40 respectively in solid lines and they meet the glass surface at points 21, 31, 41 at the centres of their respective impact zones. The maximum traverse of these spray axes is indicated in dashed lines 22, 32, 42. In the case of the central spray, its cone boundaries at a median position are indicated in solid lines at 33 and cone extends during a cycle of oscillation are indicated at 34 in dot-dash lines.

Figure 2:
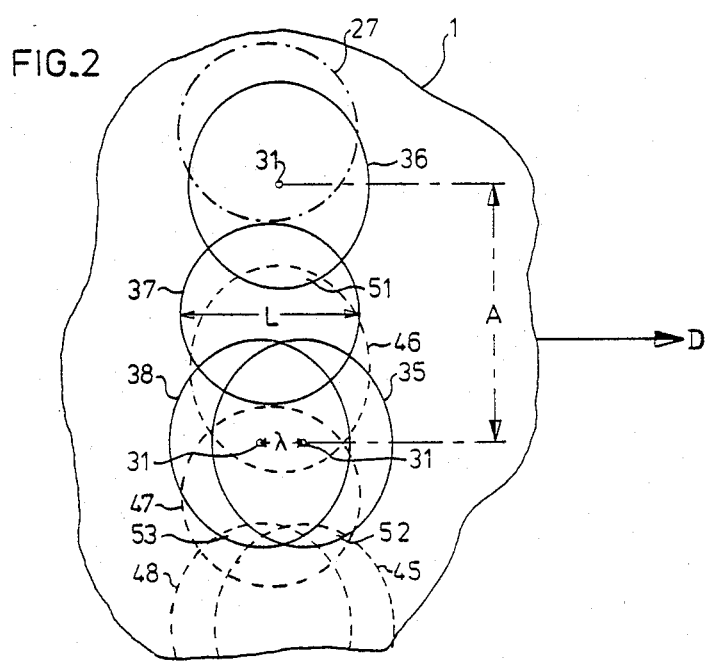
FIG. 2 is a corresponding view in the mean direction of spraying.

The impact zones of spray cones emanating from the central nozzle 3 are shown in full lines in FIG. 2 as conic sections 35, 36, 37, 38 on the glass sheet 1. In operation, assuming a glass sheet 1 is moved past a stationary bank of spraying nozzles, an impact zone 35 at the commencement of a cycle will, during oscillation of the nozzles, travel upwards on the glass sheet to a position 36 whence it will return through its median position now at 37 to an impact zone 38 level with the first zone 35 but displaced therefrom by a distance λ equal to the wavelength of the oscillating path traversed by the centre 31 of the impact zone on the glass. The amplitude of such oscillation is indicated at A. The width of the spray cone impact zone at 37 in the direction of passage of the glass is indicated at L.

In the median position, the impact zones 27, 37, 47 of the spray cones are indicated as being contiguous though this is not necessary for the performance of the invention. They may alternatively overlap or be spaced apart at their median positions. It will be noted however that when the two lower spray impact zones are at their uppermost positions, 36, 46 they overlap in a lens shaped region 51 and when they are at their lowermost positions 35, 45 and 38, 48 they again overlap in zones 52, 53. It will be noted from FIG. 1 that the amplitude A of the oscillation is greater than the distance between successive impact zone centres 31, 41 of neighbouring spray cones, and also that the uppermost boundary of the impact zone 36 whose highest point is shown at 34 in FIG. 1 lies above the centre 21 of the impact zone of the next higher spray cone in its median position. This ensures that each increment of height of the glass is impacted upon by etching solution from central and outer parts of the spray cones emanating from at least two nozzles.

It will also be noted that the wavelength λ of the oscillation is much less than the length L of the spray impact zones in the direction of travel D of the glass so that each increment of length of the glass surface is sprayed a number of times. That length L is preferably at least twice the wavelength λ. In fact as shown L is slightly more than 4 times λ.

This is very beneficial for obtaining a uniform coverage of the glass with the etching solution so that uniform etching can take place.

Figure 3:
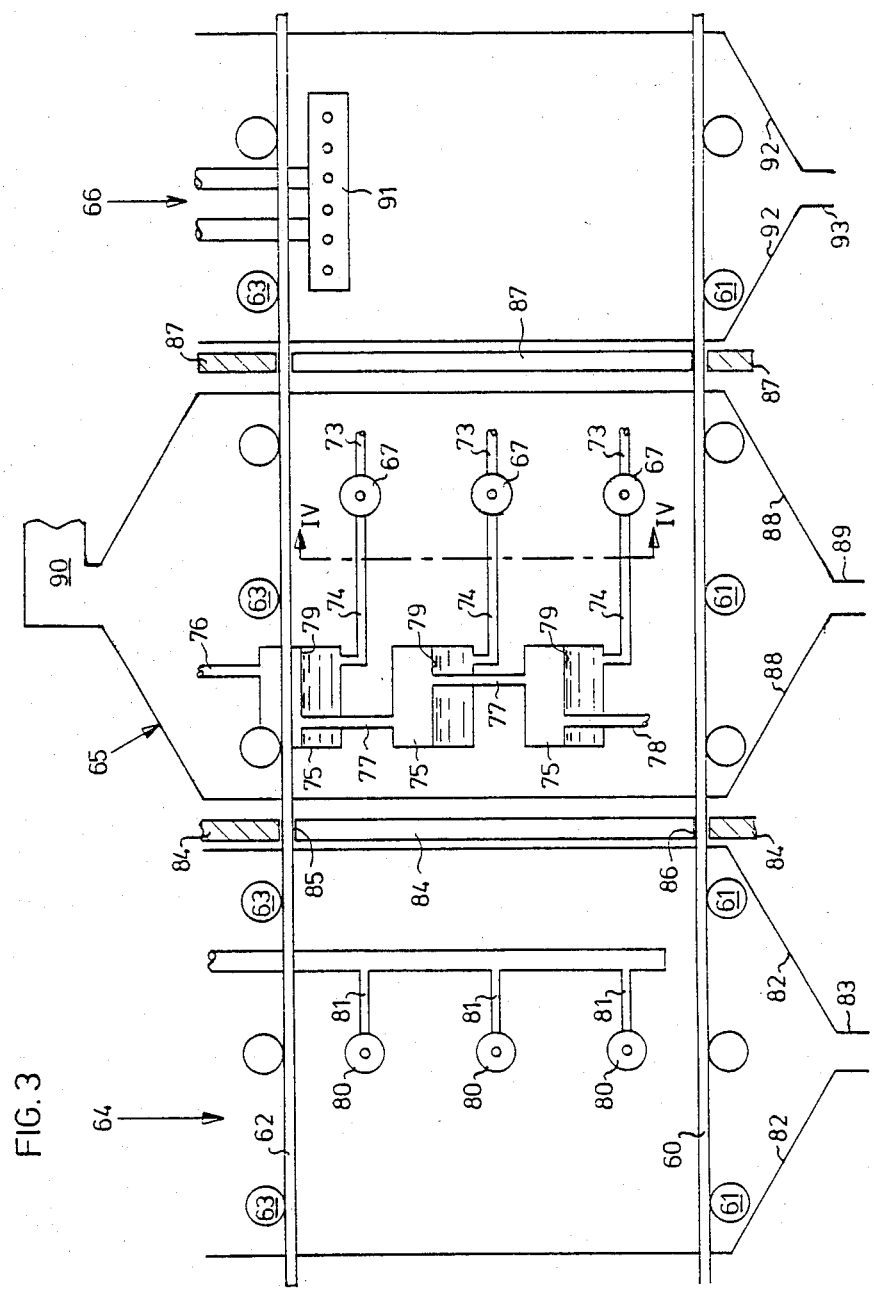
FIG. 3 is a schematic view of apparatus for performing the method according to the invention.

In FIG. 3, a conveyor belt 60, which like all apparatus parts liable to come into contact with the chemically active etching solution is made of polyvinylchloride or polytetrafluoroethylene, is driven by a motor (not shown). The conveyor belt 60 is guided and supported by a set of rollers 61. An upper conveyor belt 62 is also provided. The upper belt 62 runs parallel with and is vertically spaced above the belt 60 so that glass sheets to be treated, located in a vertical position can be supported in that position by the upper reach of belt 60 and the lower reach of the upper belt 62, the said belts being in contact with the bottom and top edges respectively of the sheets. The lower reach of the upper belt 62 is braced downwardly by a set of rollers 63. In operation, the two belts are driven so that the reaches thereof which engage the glass sheets move from left to right in the aspect of the figure and convey the sheets through successive treatment stations to be described. The belts are 3 cm thick and have a spongy texture so that they do not damage the glass sheets.

The treatment stations illustrated comprise a washing installation 64, an etching installation 65 and a flushing installation 66.

Figure 4:
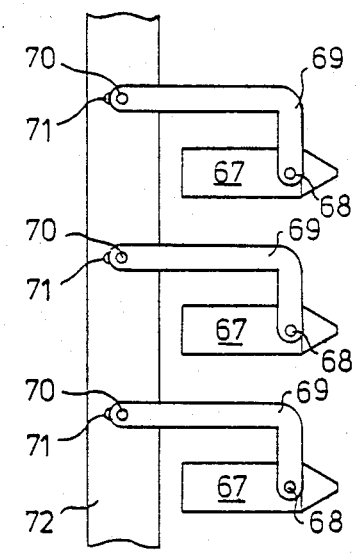
FIG. 4 is a diagrammatic view in the direction of the line IV—IV of FIG. 3.

The etching installation comprises a number of oscillatable spray nozzles 67, arranged in two vertical banks, one on each side of the path which will be followed by a sheet of glass as it is conveyed by the lower and upper belts 60, 62. Of course if it is desired to treat only one side of such a glass sheet, then only one bank of nozzles need be provided at the installation. Means for oscillating the nozzles is shown in FIG. 4, and means for feeding the nozzles with fluid to be sprayed is shown in the etching installation 65 in FIG. 3. The number of nozzles required will depend on the height of the sheets to be treated and the desired nozzle spacing.

In order that the nozzles 67 may be oscillated, they are clamped to fixed pivot axles 68 and are each made fast to an end of an L-lever 69 also pivotable about the axle 68.

The other end of each L-lever 69 carries a pin 70 which is captive in a slot 71 of a beam 72. The beam 72 is caused to oscillate up and down sliding in bearings (not shown) thus pivotally oscillating the nozzles 67.

The spray nozzles 67 are fed with fluid to be sprayed as shown in the etching installation 65 of FIG. 3. Each nozzle 67 operates on the ejector principle and is fed with gas under pressure by flexible conduits 73 and by fluid to be sprayed by flexible conduits 74. Each of those conduits 74 leads to its own reservoir 75. The reservoirs 75 are fed with fluid to be sprayed in cascade. Such fluid is introduced into the top reservoir 75 via a pipe 76. Each upper reservoir 75 includes an overflow pipe 77 leading to the next lower reservoir 75 and the bottom reservoir includes an overflow pipe 78 which can be led back to a primary source of the fluid which is to be sprayed. In this way the level of liquid 79 in the individual reservoirs remains constant. Because the nozzles 67 each pivot about a local axis, the axles 68, they remain at substantially the same height during oscillation so that a substantially constant fluid pressure head is maintained.

At the washing installation 64, a bank of fixed spray nozzles 80 may for example be fed via conduits 81 with a solution containing 98% by weight demineralised water, 1% oil and 1% of a detergent surfactant such as sodium tripolyphosphate or a detergent sold under the Trade Mark TENSIA. Excess of washing solution falls to sloping bottom walls 82 of the washing installation 64 and thence to drain pipe 83. Sprayed washing liquid is prevented from leaving the washing installation 64 by a partition 84 which is provided with upper and lower horizontal slots 85, 86 to allow passage of the upper and lower conveyor belts 62, 60 and with a vertical slot to allow passage of successive sheets of glass. Downstream of the partition 84, a tunnel heating chamber (not shown) may be and preferably is incorporated in order to remove excess washing liquid from the sheets of glass before they enter the etching installation.

The sheets then enter the etching installation, passing through the partition 84 where no tunnel heating chamber is provided, or through a second similar partition downstream of the heating chamber if such is provided. The partition at the entrance to the etching installation 65 together with another 87, at the downstream end of that installation 65 serves to limit the escape to atmosphere of the noxious and corrosive etching solution.

The etching installation has sloping bottom walls 88 incorporating a drain pipe 89 for etching solution which falls, and the whole chamber is aspirated through a chimney 90 to maintain a continuous inflow of ambient atmosphere so that substantially all fumes from the etching solution can be taken up the chimney and passed into a neutralizing chamber (not shown).

After the glass sheets have been sprayed with etching solution by the oscillating nozzles 67, they pass through the partition 87 and into the flushing installation 66. The flushing installation is located sufficiently downstream of the etching installation that, taking into account the speed of the conveyor belts 60, 62 the required dwell time for reaction between the glass and the etching solution is allowed.

In the flushing installation, the glass sheets are successively sprayed liberally with ordinary water from banks of sprayers 91, located at each side of the path of the glass. Water from these sprayers falls to sloping bottom walls 92 of the flushing installation and thence to drain pipe 93.

When the glass sheets leave the flushing installation they may be led through a second optional but preferred tunnel heating chamber for drying the treated glass. Such second chamber may, like the first, be provided with a battery of infra-red radiators.

Once dry, the glass may be inspected and taken to store.

In a specific practical example for successively treating glass sheets measuring 1.8 m in height, the conveyor speed was set at 3 m/minute. There were in fact about twenty spray nozzles 67, 80 in each of the washing and etching installations 64, 65 half located to each side for treating both sides of the glass sheets at the same time. The etching spray nozzles 67 in each bank were synchronously oscillated vertically at a rate of 140 cycles/minute. The etching spray nozzles 67 in each bank were spaced 15 cm apart with their axes parallel to one another and in a plane normal to the plane of the path followed by the glass sheets. The etching spray nozzles 67 were spaced some 45 cm from the path of the glass and were oscillated to provide a 21 cm amplitude for the point of intersection of the nozzle axis with the path of the glass. The impact zones of the spray cones on the sheets of glass travelling along their path were circular when the nozzles were in their median (horizontal) position and had each a diameter of about 15 cm. The wavelength of the oscillations in the locus of the centre of the spray cone impact zones was about 2.1 cm.

In the washing installation 64, the nozzles were arranged to discharge a total of 275 mL/min at each face of the glass sheets travelling along the path. The washing fluid used consisted of by weight 98% demineralised water, 1% oil and 1% sodium tripolyphosphate as surfactant.

After washing, the glass sheets were passed through a tunnel heating chamber (not shown) in which they were heated by infra-red heating lamps. On leaving such heating chamber and entering the etching installation the glass sheets had surface temperatures of approximately 35° C.

In the etching installation 65, each spray nozzle 67 was located below its associated reservoir 75 to give a substantially constant hydrostatic head of 15 cm for the etching solution which in this case was HF70% (aqueous) as is normally commercially available. In order to spray the etching solution, the nozzles 67, which were arranged to operate on the ejector principle, were supplied with air at an overpressure of about 100 kPa. Each nozzle 67 in the etching installation delivered about 25 mL/min. The etching solution was sprayed at ambient temperature (approximately 20° C.). The atmosphere in the etching installation 65 was sucked out through chimney 90 at a rate of 2 m$^3$ per minute. The replacement of that atmosphere by inflow of air through the glass and conveyor belt slots at each end of the etching installation was then sufficient substantially to prevent the escape of corrosive material. After etching solution has been sprayed onto the glass sheets, they travel downstream to the flushing station 66, which in this instance was located to allow a dwell time of about thirty seconds for reaction to take place between the etching solution and the glass. The glass sheets then reach the flushing installation 66 where they were generously sprayed with water by the two sprayers 91, delivering ordinary water at a total rate of about 1 m$^3$/hour whereafter the sheets were dried.

When viewed by the naked eye, glass treated in this way presents excellent "anti-reflection" properties and these properties are uniform over the whole treated surface. This presents an advantage over glass treated in the same way but without oscillating the etching spray nozzles because in that case whitish bands may be seen on the treated surface thus making the product less valuable.

Treating glass in this way using oscillating spray nozzles also enables a product of excellent quality to be obtained more rapidly, and/or with the consumption of lower quantities of etching solution.

In a variant of the embodiment illustrated in FIG. 3, the bank of fixed spray nozzles 80 is replaced with a bank of oscillating spray nozzles, like the spray nozzles 67 shown in the etching station 65.

We claim:

1. A method of modifying the light reflecting properties of a glass surface with the use of a bank of nozzles which spray etching solution on the glass surface, said method comprising:
   arranging the bank of nozzles to form a single row of nozzles;
   moving the bank of nozzles and glass surface relatively past one another, with the single row of nozzles being aligned transverse to the direction of relative movement; and
   causing the nozzles, during said moving step, to deliver synchronously oscillating divergent spray streams each in the form of a fine mist spray cone which impacts the glass surface in a respective impact zone so that in any one cycle of oscillation the impact zones of the spray cones on the glass surface together cover a continuous band-like impact region extending in a direction across the glass surface transversely of the direction of the relative movement, with the impact zone of each respective spray cone covering only a portion of the continuous band-like impact region in a direction of the region across the glass surface transversely of the direction of relative movement.

2. A method according to claim 1, wherein said causing step includes setting the relative spatial relationship of the spray cones to achieve the band-like impact region during each cycle of oscillation.

3. A method according to claim 1, wherein said causing step includes setting the amplitude of oscillation of the spray cones to achieve the band-like impact region during each cycle of oscillation.

4. A method according to claim 1, wherein said causing step includes providing that the impact zones of neighboring spray cones are contiguous during at least part of their oscillation.

5. A method according to claim 1, wherein said causing step includes providing that the impact zones of neighboring spray cones overlap during at least part of their oscillation.

6. A method according to claim 1, wherein the center of each impact zone has a median position midway between its extreme amplitude positions during a single cycle of oscillation of the associated impact zone and said causing step includes providing that the amplitude of oscillation of the center of each spray cone impact zone is at least equal to the spacing, in a direction normal to the direction of relative movement, between the median position of that impact zone center and the median position of the center of each neighboring impact zone.

7. A method according to claim 1, wherein said causing step includes providing the width of each spray cone impact zone in the direction of relative movement, the speed of the relative movement and the frequency of the oscillation such that the width is at least twice the wavelength of the oscillation of the center of the spray cone impact zone on the glass.

8. A method according to claim 7, wherein the width is at least four times the wavelength.

9. A method according to claim 1, wherein said causing step includes pivotally oscillating each nozzle about a local axis to effect the oscillation of each spray cone.

10. A method according to claim 1, and further including arranging the glass surface to be vertical while it is being sprayed.

11. A method according to claim 1, wherein said moving step includes moving the glass past the nozzle.

12. A method according to claim 1, and further including arranging the centers of the spray cone impact zones to lie, at any given instant, on a substantially straight line and wherein said causing step includes causing the spray cones to oscillate along that line.

13. A method according to claim 1, and further including arranging the centers of the spray cone impact zones to lie, at any given instant, on a substantially straight line extending substantially at right angles to the direction of relative movement.

14. A method according to claim 1, and further including feeding each spray nozzle from its own reservoir with fluid to be sprayed.

15. A method according to claim 1, and further including:

washing the glass surface by spraying fluid from a bank of nozzles prior to the spraying of the etching solution;

moving the bank of nozzles associated with said washing step and glass surface relatively past one another;

causing the nozzles associated with said washing step, during said moving step associated with said washing step, to deliver synchronously oscillating divergent spray streams each in the form of a spray cone which impacts the glass surface in a respective impact zone so that in any one cycle of oscillation of the spray cones associated with said washing step the associated impact zones of such spray cones on the glass surface together cover a continuous band-like impact region extending in a direction across the glass surface transversely of the direction of relative movement.

16. A method according to claim 1, wherein said causing step includes simultaneously feeding each respective nozzle with gas under pressure and the etching solution to be sprayed for producing the fine mist spray cone.

* * * * *